(12) United States Patent
Cop et al.

(10) Patent No.: US 11,402,509 B2
(45) Date of Patent: Aug. 2, 2022

(54) METHOD AND SYSTEM FOR USE IN PERFORMING LOCALISATION

(71) Applicant: Commonwealth Scientific and Industrial Research Organisation, Acton (AU)

(72) Inventors: Konrad Cop, Acton (AU); Paulo Borges, Acton (AU); Ross Dungavell, Acton (AU); Renaud Dube, Acton (AU)

(73) Assignee: Commonwealth Scientific and Industrial Research Organisation, Acton (AU)

(*) Notice: Subject to any disclaimer, the term of this patent is extended or adjusted under 35 U.S.C. 154(b) by 106 days.

(21) Appl. No.: 16/644,280

(22) PCT Filed: Sep. 3, 2018

(86) PCT No.: PCT/AU2018/050948
§ 371 (c)(1),
(2) Date: Mar. 4, 2020

(87) PCT Pub. No.: WO2019/040997
PCT Pub. Date: Mar. 7, 2019

(65) Prior Publication Data
US 2020/0386862 A1 Dec. 10, 2020

(30) Foreign Application Priority Data
Sep. 4, 2017 (AU) .................................. 2017903569

(51) Int. Cl.
*G01S 17/89* (2020.01)
*G01S 17/931* (2020.01)
(Continued)

(52) U.S. Cl.
CPC ............ *G01S 17/89* (2013.01); *G01S 7/4808* (2013.01); *G01S 17/42* (2013.01); *G01S 17/931* (2020.01); *G05D 1/024* (2013.01)

(58) Field of Classification Search
CPC ........ G01S 17/89; G01S 17/931; G01S 17/42; G01S 7/4808; G05D 1/024
See application file for complete search history.

(56) References Cited

U.S. PATENT DOCUMENTS 6,711,293 B1* 3/2004 Lowe .................. G06K 9/4671
382/219
9,037,403 B2   5/2015 Delp
(Continued)

FOREIGN PATENT DOCUMENTS

CN      106023210 A      10/2016
EP      2884364 A1       6/2015
WO      2017/021781 A1   2/2017

OTHER PUBLICATIONS

Barfoot et al., "Into Darkness: Visual Navigation based on a Lidar-Intensity-Image Pipeline". In Proceedings of the International Symposium on Robotics Research (ISRR), Springer Tracts in Advanced Robotics, 2013, 114:487-504.

(Continued)

*Primary Examiner* — Bryan Bui
(74) *Attorney, Agent, or Firm* — Merchant & Gould P.C.

(57) ABSTRACT

A method for use in performing localisation in a three-dimensional (3D) environment, the method including in one or more electronic processing devices: determining from a local scan performed by at least one laser sensor, intensity data based at least in part on a power of radiation returned to the at least one laser sensor from points in a local point cloud obtained from the local scan; calculating a first intensity descriptor for the local point cloud using the intensity data; retrieving a plurality of previously calculated (Continued)

second intensity descriptors that are each associated with a respective portion of a map of the 3D environment; comparing the first intensity descriptor with at least some of the second intensity descriptors; and, determining a location with respect to the map at least in part in accordance with results of the comparison.

20 Claims, 14 Drawing Sheets

(51) Int. Cl.
  *G01S 7/48* (2006.01)
  *G01S 17/42* (2006.01)
  *G05D 1/02* (2020.01)

(56) References Cited

U.S. PATENT DOCUMENTS

| | | |
|---|---|---|
| 2011/0205338 A1 | 8/2011 | Choi et al. |
| 2013/0138247 A1 | 5/2013 | Gutmann et al. |
| 2014/0180590 A1 | 6/2014 | Stroila et al. |
| 2014/0240501 A1 | 8/2014 | Newman et al. |
| 2014/0297092 A1* | 10/2014 | Delp .................... G05D 1/0274 701/25 |
| 2015/0339541 A1 | 11/2015 | Fan et al. |
| 2016/0209846 A1 | 7/2016 | Eustice et al. |

OTHER PUBLICATIONS

Bosse et al., "Place recognition using keypoint voting in large 3D lidar datasets," IEEE Int. Conf. on Robotics and Automation, 2013.

Dube et al. "SegMatch: Segment based loop-closure for 3D point clouds" in arXiv preprint arXiv, 2016 (8 pages).

Hata et al., "Road marking detection using LIDAR reflective intensity data and its application to vehicle localization." 17th International IEEE Conference on Intelligent Transportation Systems, 2014, pp. 584-589.

Kashani et al., "A Review of LIDAR Radiometric Processing: From Ad Hoc Intensity Correction to Rigorous Radiometric Calibration," Sensors, 2015, 15:28099-28128.

Pandey et al., "Toward mutual information based place recognition," in Proc. of the IEEE Int. Conf. on Robotics and Automation (ICRA), 2014, pp. 3185-3192.

Rohling et al., "A fast histogram based similarity measure for detecting loop closures in 3-d lidar data," IEEE/RSJ Int. Conf. on Intelligent Robots and Systems, 2015.

Steder et al. "Place recognition in 3d scans using a combination of bag of words and point feature based relative pose estimation," IEEE/RSJ Int. Conf. on Intelligent Robots and Systems, 2011.

Khan et al., "Modeling Laser Intensities For Simultaneous Localization and Mapping", IEEE Robotics and Automation Letters, 2016, 1(2):692-699.

* cited by examiner

METHOD AND SYSTEM FOR USE IN PERFORMING LOCALISATION

This application is a National Stage Application of PCT/AU2018/050948, filed 3 Sep. 2018, which claims benefit of Serial No. 2017903569, filed 4 Sep. 2017 in Australia and which application are incorporated herein by reference. To the extent appropriate, a claim of priority is made to each of the above disclosed applications.

BACKGROUND OF THE INVENTION

The present invention relates to a method and system for use in performing localisation in a three-dimensional (3D) environment. The method and system has particular application to mobile robotics and autonomous vehicle navigation.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Global localisation is a key element for autonomous robotic navigation. It is used for tasks such as the robot "wake up" problem, "lost or kidnapped" robot problem, and loop closure in Simultaneous Localisation and Mapping (SLAM). The global localisation task consists of two main elements: i) recognition of a previously visited place and ii) position and orientation (pose) estimation with respect to a reference frame of the revisited place. Both place recognition and pose estimation are required in order to achieve full global localisation. Typically, when global localisation is performed, a small point cloud obtained by scanning a certain place in the environment (a local scan) is compared against previously obtained scan data (a global map) and a relative transformation is computed.

The classical approach to tackle the global localisation task is to use recursive estimation methods such as Kalman Filter or Monte Carlo Localisation (a particle filter approach). These algorithms were developed in times when the data obtained by the robot sensors were limited and noisy. The position of the robot in the global map was impossible to determine uniquely by a static observation of the surroundings. Therefore in these methods the robot must initially drive around, observe the environment and update the probability of being in certain positions until the certainty increases to an acceptable level.

It is also possible to perform localisation using external sensor infrastructure such as the global positioning system (GPS) or external beacons, although this is limited as it is not available in many environments in which an autonomous vehicle or robot may navigate, for example in indoor locations where GPS is denied. Cameras may also be used for place recognition, however they suffer from lower performance in unfavourable lighting conditions and are not usable to perform localisation in the dark.

Several methods for global localisation in 3D point clouds have been proposed, for example using 3D Light imaging, detection and ranging (LiDAR) sensors. The usage of global descriptors (that compute single statistics for the whole local scan based on geometrical information) is known to describe places by a histogram of points elevation. An alternative method is to create the descriptor by dividing the point cloud into a cubic grid and calculate the density function which describes the shapes that are later gathered into histograms. One issue with global descriptors is the fact that the global map is interpreted as a discrete set of places along the trajectory, and each place has a defined origin forming a graph-like structure. In this case the only possible robot locations are in the graph vertices. When the robot is between the vertices or off the original trajectory the exact location cannot be determined.

It is also known to perform localisation using local descriptors based on geometrical features in the point clouds. Multiple keypoints are selected from the point clouds and local descriptors (of a significantly smaller radius than the point cloud) are calculated around them. Recognition is performed by finding the most similar descriptors between different clouds. This type of geometrical recognition procedure is inefficient and computationally complex, particularly for large maps.

Whilst local geometrical descriptors can be used to obtain the transformation and accurate pose, localisation methods based on this approach are computationally inefficient and not suited to real time applications. The use of global descriptors is useful in so far as it provides an efficient way for dimensionality reduction and correspondence search, however they cannot provide the relative transformation and pose.

A more efficient algorithm for localisation is therefore needed which is able to localise quickly in unstructured environments without GPS infrastructure and the like and under any lighting conditions.

Furthermore, it would be advantageous to be able to localise from a stationary scan and using only a laser sensor such as a 3D LiDAR.

It is against this background, and the problems and difficulties associated therewith, that the present invention has been developed.

SUMMARY OF THE PRESENT INVENTION

In one broad form, an aspect of the present invention seeks to provide a method for use in performing localisation in a three-dimensional (3D) environment, the method including in one or more electronic processing devices:
  a) determining from a local scan performed by at least one laser sensor, intensity data based at least in part on a power of radiation returned to the at least one laser sensor from points in a local point cloud obtained from the local scan;
  b) calculating a first intensity descriptor for the local point cloud using the intensity data;
  c) retrieving a plurality of previously calculated second intensity descriptors that are each associated with a respective portion of a map of the 3D environment;
  d) comparing the first intensity descriptor with at least some of the second intensity descriptors; and,
  e) determining a location with respect to the map at least in part in accordance with results of the comparison.

In one embodiment, the method includes, in the one or more electronic processing devices, calculating the first intensity descriptor based on at least one statistical measure for a distribution of the intensity data in the local point cloud.

In one embodiment, the method includes, in the one or more electronic processing devices, calculating the first intensity descriptor by:

a) dividing the local point cloud into a plurality of spatially distributed local point cloud segments;
b) for each local point cloud segment calculating a first intensity descriptor segment based on a statistical measure for a distribution of intensity data within the local point cloud segment; and,
c) calculating the first intensity descriptor using each first intensity descriptor segment.

In one embodiment, the statistical measure is indicative of a distribution of the frequency of each of a plurality of intensity values.

In one embodiment, the local point cloud segments have an at least partially spherical structure.

In one embodiment, the local point cloud segments include at least one of:
a) a plurality of concentric spherical regions; and,
b) at least two concentric spherical regions segmented into octants.

In one embodiment, a radius of an outer spherical region is based on a range of the sensor and a radius of one or more inner spherical regions is selected so that each spherical region contains a similar number of local point cloud points.

In one embodiment, the second intensity descriptors are previously calculated using intensity data associated with points in a point cloud corresponding to the map of the 3D environment, the intensity data based at least in part on a power of radiation returned to the at least one laser sensor from the points in the point cloud in a previously performed scan of the 3D environment.

In one embodiment, each second intensity descriptor includes second intensity descriptor segments obtained for point cloud segments of a part of the point cloud corresponding to the respective portion of the map.

In one embodiment, the plurality of second intensity descriptors are stored in a data store and wherein the method includes, in the one or more electronic processing devices, retrieving the plurality of second intensity descriptors from the data store.

In one embodiment, the method includes, in the one or more electronic processing devices:
a) comparing the first intensity descriptor to a second intensity descriptor by:
  i) comparing the first intensity descriptor segments with the second intensity descriptor segments; and,
  ii) determining a similarity value based on results of the comparisons; and,
b) selecting one or more second intensity descriptors based on the similarity values.

In one embodiment, the method includes, in the one or more electronic processing devices:
a) for each comparison between the first intensity descriptor and a second intensity descriptor:
  i) determining a plurality of relative orientations of the second intensity descriptor; and,
  ii) comparing the first intensity descriptor segments with the second intensity descriptor segments for each of the plurality of relative orientations of the second intensity descriptor;
b) determining a similarity value for each orientation; and,
c) selecting a minimum similarity value.

In one embodiment, the method includes, in the one or more electronic processing devices, using similarity values between the first intensity descriptor and respective second intensity descriptors to rank portions of the map as potential locations.

In one embodiment, the method includes, in the one or more electronic processing devices:
a) generating a submap using at least one portion of the map selected based on the ranking of portions of the map as potential locations; and,
b) performing geometrical recognition within the submap.

In one embodiment, the method includes, in the one or more electronic processing devices, performing the geometrical recognition by:
a) extracting local keypoints from the local point cloud;
b) calculating local geometrical descriptors for each local keypoint;
c) retrieving previously calculated submap geometrical descriptors calculated using submap keypoints associated with the portions of the map that are included in the submap;
d) determining correspondences between local and submap geometrical descriptors;
e) clustering correspondences based on geometric consistency to form one or more candidate clusters; and,
f) determining transformations for each candidate cluster.

In one embodiment, the method includes, in the one or more electronic processing devices:
a) selecting a candidate cluster having the highest number of correspondences;
b) comparing the number of correspondences in the selected candidate cluster to a first threshold; and
c) at least one of:
  i) determining that the selected candidate cluster is a false match if the number of correspondences is below the first threshold; and,
  ii) determining that the selected candidate cluster is indicative of a most likely location if the number of correspondences is above the first threshold.

In one embodiment, for the candidate cluster indicative of the most likely location, the method includes, in the one or more electronic processing devices, refining the transformation to align the local point cloud with a submap point cloud associated with the submap.

In one embodiment, the method includes, in the one or more electronic processing devices, performing an Iterative Closest Point (ICP) on at least part of the local and submap point clouds to refine the transformation and determine the pose.

In one embodiment, the method includes, in the one or more electronic processing devices:
a) determining a fitness score that is indicative of how well the local and submap point clouds are aligned;
b) comparing the fitness score to a second threshold; and
c) selectively verifying the location depending on results of the comparison.

In one embodiment, the method includes, in the one or more electronic processing devices, generating a new submap if one of:
a) the number of correspondences is below the first threshold; and,
b) the fitness score is above the second threshold.

In one embodiment, the method includes, in the one or more electronic processing devices, generating a new submap at least in part using other portions of the map selected based on the ranking of portions of the map as potential locations.

In one embodiment, the method includes, in the one or more processing devices:
a) determining how many potential locations have been included in the submap; and,
b) at least one of:

i) terminating the localisation method if the number of potential locations has reached a defined maximum; and, ii) increasing the size of the submap if the number of potential locations is below the defined maximum.

In one embodiment, the local scan is at least one of:
a) a stationary scan.
b) a wake-up scan associated with a mobile robot or autonomous vehicle; and,
c) a loop closure scan.

In one embodiment, the at least one laser sensor is a light imaging, detection and ranging (LiDAR) sensor.

In one embodiment, portions of the map are extracted from the map along a mapping trajectory.

In one embodiment, the mapping trajectory is divided into segments of a pre-defined length and each portion of the map is defined as a point cloud obtained from the at least one sensor as it travelled along a respective segment of the mapping trajectory.

In another broad form, an aspect of the present invention seeks to provide a system for use in performing localisation in a three-dimensional (3D) environment, the system including one or more electronic processing devices configured to:
a) determine from a local scan performed by at least one laser sensor, intensity data based at least in part on a power of radiation returned to the at least one laser sensor from points in a local point cloud obtained from the local scan;
b) calculate a first intensity descriptor for the local point cloud using the intensity data;
c) retrieve a plurality of previously calculated second intensity descriptors that are each associated with a respective portion of a map of the 3D environment;
d) compare the first intensity descriptor with at least some of the second intensity descriptors; and,
e) determine a location with respect to the map at least in part in accordance with results of the comparison.

In one embodiment, the system includes at least one laser sensor configured to perform the local scan.

In one embodiment, the at least one sensor is a light imaging, detection and ranging (LiDAR) sensor.

In one embodiment, the system further includes a data store containing the plurality of second intensity descriptors and wherein the data store is accessible by one or more electronic processing devices to retrieve the plurality of second intensity descriptors.

In one embodiment, the at least one laser sensor, one or more electronic processing devices and data store are located on-board a mobile robot or autonomous vehicle.

It will be appreciated that the broad forms of the invention and their respective features can be used in conjunction, interchangeably and/or independently, and reference to separate broad forms in not intended to be limiting.

BRIEF DESCRIPTION OF THE DRAWINGS

A non-limiting example of the present invention will now be described with reference to the accompanying drawings, in which: —

DETAILED DESCRIPTION OF THE PREFERRED EMBODIMENTS

Figure 1:
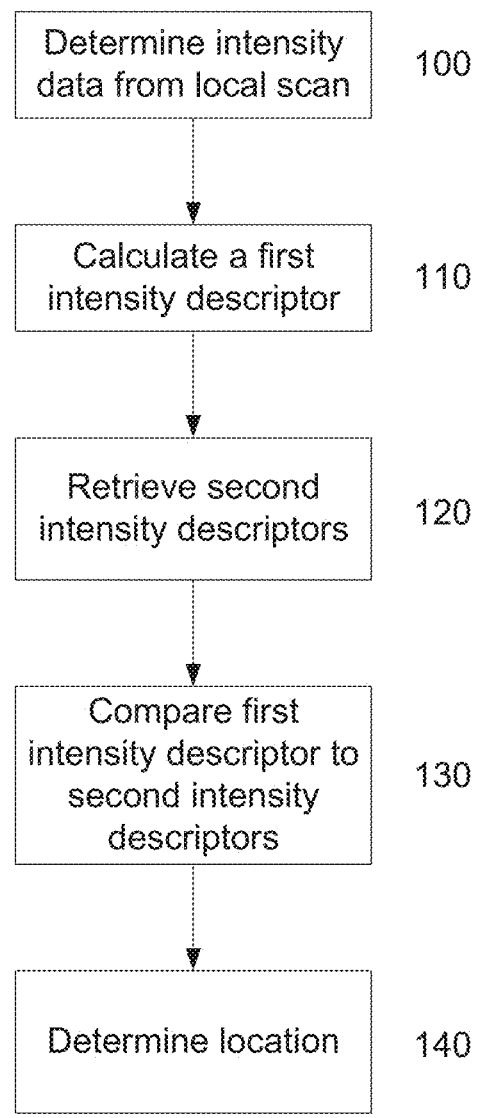
FIG. 1 is a flow chart of an example of a method for use in performing localisation in a 3D environment.

An example of a method for use in performing localisation in a three-dimensional (3D) environment will now be described with reference to FIG. 1.

For the purpose of illustration, it is assumed that the method is performed at least in part using one or more electronic processing devices forming part of one or more processing systems associated with an autonomous vehicle or mobile robot (hereinafter "robot"). The one or more electronic processing devices are configured to receive data from at least one laser sensor such as a light imaging, detection and ranging (LiDAR) sensor that is mounted on-board the robot and capable of performing scans of the robot's surroundings.

In this example, at step 100, the method includes determining from a local scan performed by the least one laser sensor, intensity data based at least in part on a power of radiation returned to the at least one laser sensor from points in a local point cloud obtained from the local scan. It is to be understood that the local scan is a scan of a portion of the 3D environment, for example of the immediate surroundings of a robot upon "wake-up". The local scan may be performed whilst the robot is stationary to enable the robot to determine its position in the 3D environment before moving.

The local scan performed by the laser sensor consists of a local point cloud of the robot's surroundings. The local point cloud consists of spatial information from which the structure of the environment is determined. In addition to range information, the laser sensor can also provide a measure of intensity for each point, which is the strength of return after reflection from a surface. More precisely, intensity refers to the ratio of power that was emitted by the laser and the power that returned to it. Whilst the term intensity is used generally throughout this disclosure, it should be understood that related parameters such as reflectivity should also be considered to fall within the scope of the term intensity. Reflectivity is a property of a surface obtained from intensity by compensating for intrinsic parameters of the sensor as well as extrinsic features such as distance to the object, incidence angle, air density etc.

It is to be understood that the scope of the term "determining" or related terms such as "determine" as used throughout this specification shall be taken to include "obtaining", "receiving", "calculating" or "deriving" the requisite data or information. The use of the term "determining" does not therefore imply that any processing is required to ascertain the data.

At step 110, the method includes calculating a first intensity descriptor for the local point cloud using the intensity data. In this way, a single descriptor is calculated for the entire local point cloud in order to reduce dimensionality of the data set (here the intensity values of each point in the local point cloud which can consist of around 0.5 million points) and at the same time maintain unique information and descriptiveness. The structure of the first intensity descriptor shall be described in further detail below.

At step 120, the method includes retrieving a plurality of previously calculated second intensity descriptors that are each associated with a respective portion of a map of the 3D environment as will be described in further detail below.

It is to be understood that the first and second intensity descriptors are global descriptors that encode/describe a point cloud on which they are based. The first intensity descriptor is a global descriptor for the local point cloud obtained from the local scan. Each second intensity descriptor is a global descriptor for a point cloud associated with a respective portion of the map. In this regard, and as will be described further below, the map of the 3D environment may be considered a global map (i.e. global point cloud) that is segmented into a plurality of smaller point clouds which each correspond to a unique place on the map.

It is therefore important to recognise that the method relies upon an existing map (i.e. global point cloud) of the 3D environment that has previously been determined in a mapping exercise using the laser sensor, for example in a SLAM based mapping of the environment. After mapping, the map is segmented into a plurality of portions, each having a respective point cloud and second intensity descriptors are determined for each portion or segment of the map. The point cloud associated with each portion of the map may also be referred to as a 'place' having an origin at the centre of the portion. The second intensity descriptors may be stored in a data store and loaded by the processing device in order to localise in the map.

At step 130, the method includes comparing the first intensity descriptor with at least some of the second intensity descriptors. Typically, this is a simple linear correspondence search which is performed between the first intensity descriptor of the local scan and the second intensity descriptor of all portions (i.e. places) extracted from the map (a brute force approach). Whilst second intensity descriptors of all portions in the map may be used in the comparison, it may be possible for the algorithm to terminate the comparison process before using every second intensity descriptor if confidence is reached that the correct place has been found.

Finally, at step 140, the method includes determining a location with respect to the map at least in part in accordance with results of the comparison. The output of the comparison step is the selection of a most probable place which corresponds to the portion of the map having the highest similarity (based on intensity data) to the local scan. In some examples, intensity-based recognition may be sufficient alone to achieve localisation in the map. It should be understood however, that accuracy of the location would not be better than the resolution of the segmentation of the map. Whilst a more accurate position and orientation (i.e. pose) could be estimated based on rotational difference between reference frames of the intensity descriptors, accuracy would still be limited because of the noise in the clouds which would influence the precision of the reference frame estimation. In other examples, geometrical recognition may also be performed using the most probable location determined from the intensity-based recognition. As shall be described in further detail below, geometrical recognition may be used to determine the transformation between point clouds to enable accurate determination of pose. Furthermore, geometrical recognition may be used to validate that the intensity-based recognition is correct.

The above described method provides a number of advantages.

Firstly, the method enables global localisation to be performed using data from a laser sensor (such as a LiDAR) only. The method does not rely on information from additional sensors, such as cameras and it can be performed in unstructured environments lacking external sensor infrastructure such as GPS or beacons. As an example, the method could be utilised for navigation in indoor environments where GPS is denied or in industrial areas where GPS suffers from severe multipath and becomes unusable. The method may also be performed in unfavourable lighting conditions and in the dark for example, where traditional cameras would be ineffective.

The method is computationally efficient due to the use of the intensity descriptors to determine the most likely position of the local scan with respect to the map. In this way, the intensity-based recognition is able to be used to reduce the search space to a small part of the map which may be referred to as a 'prior' estimate of the position of the robot. Geometrical recognition may then be performed on the reduced search space to determine an accurate pose instead of the entire search space which is the case for traditional geometric place recognition algorithms that have enormous computational complexity. The method may therefore be used as a quick and efficient way to determine an approximate location in the map or to significantly reduce the search space for a geometrical recognition to determine an accurate pose.

The above described method may be particularly useful for localisation at the beginning of an operation or in case of losing a track or path. These tasks are usually referred to as wake-up and lost robot problems. Similarly, the method may be used in other scenarios such as loop closure where it is desirable to determine if a robot has returned to a previously visited place. Advantageously, the method can be used to localise a stationary robot without requiring it to drive around and gather additional data. This can be important for safety reasons as sometimes at wake-up a robot must move in a precisely specified direction because otherwise it can damage some parts of the environment (or itself).

A number of further features will now be described.

In one example, the method includes, in the one or more electronic processing devices calculating the first intensity descriptor based on at least one statistical measure for a distribution of the intensity data in the local point cloud. The statistical measure must be selected to reduce the dimensionality of the intensity data in the local point cloud whilst maintaining sufficient unique information and descriptiveness for purposes of comparison to other intensity descriptors.

In this regard, typically the method includes, in the one or more electronic processing devices, calculating the first intensity descriptor by dividing the local point cloud into a plurality of spatially distributed local point cloud segments. For each local point cloud segment, the method further includes calculating a first intensity descriptor segment based on a statistical measure for a distribution of intensity data within the local point cloud segment; and, calculating the first intensity descriptor using each first intensity descriptor segment. The structured division of the local point cloud ensures uniqueness of the descriptor by associating the statistics with locations in space.

It should be noted that a single statistical descriptor could be used for the entire local point cloud, however the dimensionality reduction would likely be too great to the extent that the descriptor loses uniqueness.

In one example, the statistical measure is indicative of a distribution of the frequency of each of a plurality of intensity values. One way of encoding the distribution of points in a very compact form is to use a histogram. Accordingly, each first intensity descriptor segment is a histogram of intensity of points in a specific region of space in the local point cloud and the entire first intensity descriptor is therefore a group of histograms which together uniquely describe the local point cloud in a compact and efficient manner.

The structure of the first intensity descriptor shall now be described. Typically, the local point cloud segments have an at least partially spherical structure. The local point cloud segments include at least one of a plurality of concentric spherical regions; and, at least two concentric spherical regions segmented into octants. In the case of a plurality of concentric spherical regions, the descriptor will perform better than a descriptor without spatial segmentation, however it may fail to distinguish clouds that have similar objects located at the same distance from the origin but on different sides. By dividing spherical regions into octants (i.e. dividing spheres into hemispheres and then applying azimuthal division) it is possible to define where is "left", "right", "up" and "down" in the point cloud.

In one example, a radius of an outer spherical region is based on a range of the sensor and a radius of one or more inner spherical regions is selected so that each spherical region contains a similar number of local point cloud points.

Similar to the above description of the first intensity descriptor, it should be understood that the second intensity descriptors are previously calculated using intensity data associated with points in a point cloud corresponding to the map of the 3D environment, the intensity data based at least in part on a power of radiation returned to the at least one laser sensor from the points in the point cloud in a previously performed scan of the 3D environment. Furthermore, each second intensity descriptor includes second intensity descriptor segments obtained for respective point cloud segments of a part of the point cloud corresponding to the respective portion of the map. It is to be appreciated therefore, that the second intensity descriptors have the same structure as the first intensity descriptor so that the descriptors can be easily compared.

Typically, the plurality of second intensity descriptors are stored in a data store and the method includes, in the one or more electronic processing devices, retrieving the plurality of second intensity descriptors from the data store each time the localisation method is performed. As previously mentioned, the second intensity descriptors are calculated earlier when the 3D environment is mapped to obtain the map and discretization is performed to extract portions of the map from which the descriptors are computed.

Typically, the method includes, in the one or more electronic processing devices, comparing the first intensity descriptor to a second intensity descriptor by comparing the first intensity descriptor segments with the second intensity descriptor segments; and, determining a similarity value based on results of the comparisons; and, selecting one or more second intensity descriptors based on the similarity values. In one example, the method involves comparing histograms of the first intensity descriptor with respective histograms of each second intensity descriptor. Respective histograms may be compared using the chi-squared test which provides a similarity measure between histograms. The average of all histogram comparisons may then be determined to provide a similarity measure between intensity descriptors. One or more most similar second intensity descriptors may then be selected based on the similarity values and how large the prior search area needs to be.

It is to be appreciated that a reference frame of a point cloud may be estimated using a technique such as Principal Components Analysis (PCA). This is an important consideration for the comparison as it necessary to ensure that corresponding descriptor segments of the respective point clouds are being compared. Whilst PCA can determine orthogonal vectors to form a reference frame, it cannot determine signs of the vectors. This direction disambiguation therefore needs to be carefully considered.

Accordingly, in one example, the method includes, in the one or more electronic processing devices for each comparison between the first intensity descriptor and a second intensity descriptor, determining a plurality of relative orientations of the second intensity descriptor; and, comparing the first intensity descriptor segments with the second intensity descriptor segments for each of the plurality of relative orientations of the second intensity descriptor. A similarity value can then be determined for each orientation and the minimum similarity value can be selected as the measure of similarity between the respective first and second intensity descriptor.

Once all similarity values have been determined, the method includes, in the one or more electronic processing devices, using the similarity values between the first intensity descriptor and respective second intensity descriptors to rank portions of the map as potential locations. In this way, the intensity-based recognition is able to determine a ranked order based on similarity of places extracted from the map that correspond to the local scan.

The size of the reduced search area (i.e. the 'prior' estimate of the location of the robot in the map may then be selected and accordingly the method may include in the one or more electronic processing devices generating a submap using at least one portion of the map selected based on the ranking of portions of the map as potential locations, and, performing geometrical recognition within the submap. It is to be appreciated that the submap or 'prior' may be formed by merging point clouds associated with portions of the map selected based on the similarity rankings and that depending on how the map is discretized there may be significant overlap between point clouds of adjacent portions.

In one example, the method includes, in the one or more electronic processing devices, performing the geometrical recognition by extracting local keypoints from the local point cloud, calculating local geometrical descriptors for each local keypoint, retrieving previously calculated submap geometrical descriptors calculated using submap keypoints associated with the portions of the map that are included in the submap, determining correspondences between local and submap geometrical descriptors, clustering correspondences based on geometric consistency to form one or more candidate clusters, and, determining transformations for each candidate cluster. The output of this stage is a set of candidate places for the local scan with transformations to the map.

It is to be appreciated that submap geometrical descriptors are calculated along with the second intensity descriptors for the map after the 3D environment is mapped and stored in the data store. The geometrical descriptors are calculated for each portion extracted from the map and therefore when portions of the map are merged into a submap, the corresponding geometrical descriptors are retrieved for use in performing the geometrical recognition.

Typically, the method further includes, in the one or more electronic processing devices, selecting a candidate cluster having the highest number of correspondences, comparing the number of correspondences in the selected candidate cluster to a first threshold; and at least one of: determining that the selected candidate cluster is a false match if the number of correspondences is below the first threshold; and, determining that the selected candidate cluster is indicative of a most likely location if the number of correspondences is above the first threshold. The number of correspondences is therefore a first validation condition based on geometrical features that must be met otherwise the place (portion of map) is discarded as an incorrect match.

Having determined the candidate cluster indicative of the most likely location, the method then typically includes, in the one or more electronic processing devices, refining the transformation to align the local point cloud with a submap point cloud associated with the submap. In one example, this is achieved by performing an Iterative Closest Point (ICP) procedure on at least part of the local and submap point clouds to refine the transformation and determine the pose. After the refinement, the point clouds are precisely aligned. If ICP converges successfully it outputs the estimated transformation matrix.

As a further validation step, the method may further include, in the one or more electronic processing devices, determining a fitness score that is indicative of how well the local and submap point clouds are aligned, comparing the fitness score to a second threshold; and, selectively verifying the location depending on results of the comparison. If the fitness score exceeds an acceptable level (i.e. above the second threshold) the location is considered a false match.

A false match can have multiple reasons such as how dynamic the environment is (the objects seen during the mapping may not be visible anymore or may have moved). Additionally, the robot may simply be far off the original mapping trajectory in which case the local scan may not look similar to any of the portions extracted from the map.

Typically, if either validation condition fails, the method looks to increase the size of the submap (i.e. the prior search area). Accordingly, in one example, the method includes, in the one or more electronic processing devices, generating a new submap if one of: the number of correspondences is below the first threshold; and, the fitness score is above the second threshold. The new submap may be generated at least in part using other portions of the map selected based on the ranking of portions of the map as potential locations (from the intensity-based recognition procedure).

In this regard, it is to be appreciated that there is limit to the number of extracted portions of the map that should be combined together to form the submap or prior. One reason for this is that as the submap grows so does the number of geometrical descriptors and therefore the localisation procedure becomes slower. As the system is advantageous due to the reduction in computational complexity, the submap should be limited to a size so that the total amount of geometrical descriptors used will not result in the processing time being longer that the traditional method (i.e. based on geometrical correspondence search in the entire map).

Accordingly, in one example, the method includes, in the one or more processing devices: determining how many potential locations have been included in the submap; and, at least one of: terminating the localisation method if the number of potential locations has reached a defined maximum; and, increasing the size of the submap if the number of potential locations is below the defined maximum.

In the above described method, portions of the map (i.e. 'places') are extracted from the map along a mapping trajectory. In this way, the mapping trajectory is divided into segments of a pre-defined length and each portion of the map is defined as a point cloud obtained from the at least one sensor as it traveled along a respective segment of the mapping trajectory. This method of segmenting the map was found to be more robust than other methods such as radius-based approaches. Such an approach is based on selecting a location in the map and extracting a point cloud based on sensor range. This however is not correct as the extracted scan would contain points that are not visible from the robot location, due to the fact that they are occluded by objects that lay closer to the sensor. Extracting places along the trajectory is therefore preferred as it ensures that extracted places correspond to the local scans as they only include features that the robot can in fact see from that location.

In a further broad form, there is provided a system for use in performing localisation in a three-dimensional (3D) environment, the system including one or more electronic processing devices configured to: determine from a local scan performed by at least one laser sensor, intensity data based at least in part on a power of radiation returned to the at least one laser sensor from points in a local point cloud obtained from the local scan; calculate a first intensity descriptor for the local point cloud using the intensity data; retrieve a plurality of previously calculated second intensity descriptors that are each associated with a respective portion of a map of the 3D environment; compare the first intensity descriptor with at least some of the second intensity descriptors; and, determine a location with respect to the map at least in part in accordance with results of the comparison.

Typically, the system includes at least one laser sensor configured to perform the local scan. In one example, the at least one laser sensor is a light imaging, detection and ranging (LiDAR) sensor. Advantageously, no additional sensors are required in order to achieve full global localisation.

In one example, the system further includes a data store containing the plurality of second intensity descriptors and wherein the data store is accessible by one or more electronic processing devices to retrieve the plurality of second intensity descriptors.

Preferably, the at least one laser sensor, one or more electronic processing devices and data store are located on-board a mobile robot or autonomous vehicle. In other arrangements however, the processing devices may wirelessly communicate with a remote data store in order to retrieve the required second intensity descriptors.

Figure 2:
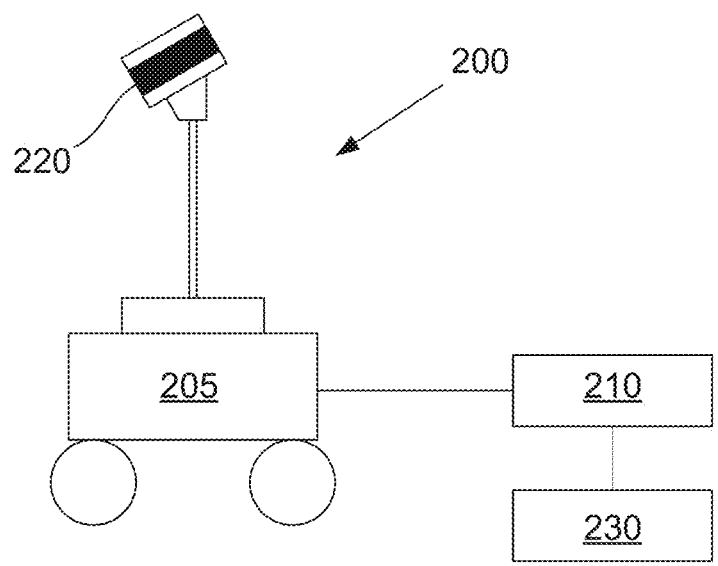
FIG. 2 is a schematic diagram of an example of a system for use in performing localisation in a 3D environment.

An example of a system for use in performing localisation in a 3D environment will now be described with reference to FIG. 2.

In this example, the system 200 includes at least one electronic processing device 210 located on-board an autonomous vehicle or robot 205. The electronic processing device 210 is coupled to a data store 230 which contains map information such as the global point cloud, mapping trajectory, second intensity descriptors and geometrical descriptors associated with the map. A laser sensor 220 is mounted on-board the robot 205 and is configured to perform scans of the environment surrounding the robot 205. In one example, the laser sensor is a 3D LiDAR sensor such as a VLP-16 3D LiDAR produced by Velodyne. To increase the information obtained from the sensor, the sensor may be mounted so as to rotate about a vertical axis and furthermore the sensor may be tilted at an angle of 45 degrees from the vertical. In one example, a local scan is considered to be a point cloud generated by two rotations of the above-described sensor.

Figure 3:
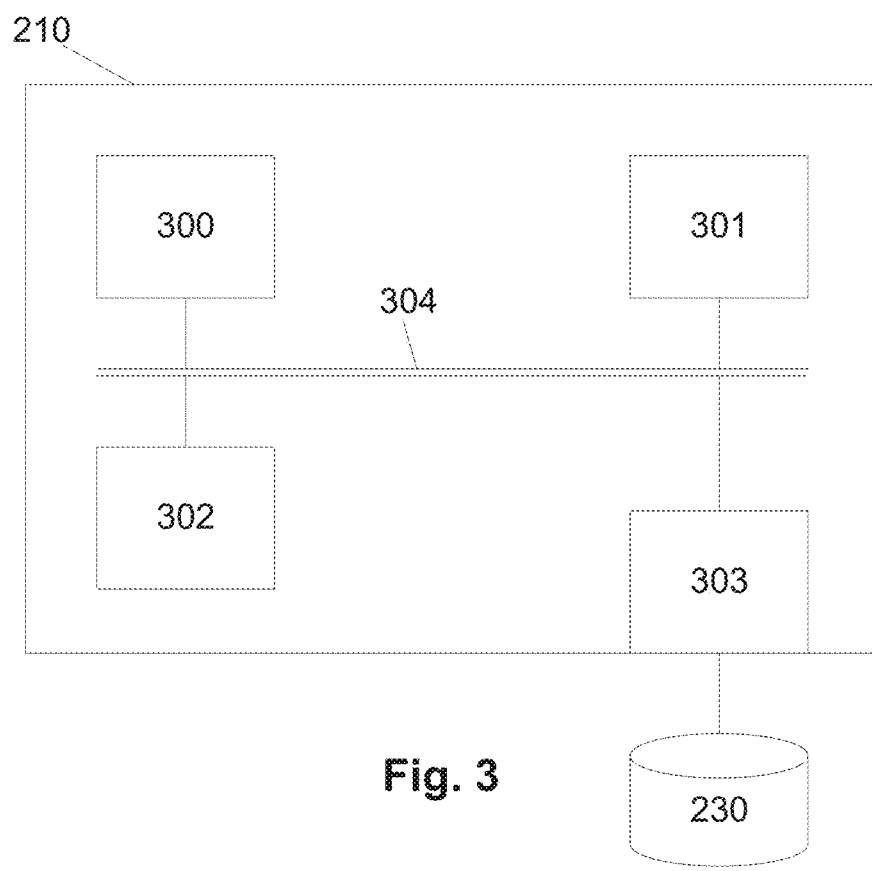
FIG. 3 is a schematic diagram of an example of a processing system of FIG. 2.

An example of an electronic processing device 210 is shown in FIG. 3. In this example, the processing device 210 includes at least one microprocessor 300, a memory 301, an optional input/output device 302, such as a keyboard and/or display, and an external interface 303, interconnected via a bus 304 as shown. In this example the external interface 303 can be utilised for connecting the processing device 210 to peripheral devices, such as a communication network, data store 230, other storage devices, or the like. Although a single external interface 303 is shown, this is for the purpose of example only, and in practice multiple interfaces using various methods (e.g. Ethernet, serial, USB, wireless or the like) may be provided.

In use, the microprocessor 300 executes instructions in the form of applications software stored in the memory 301 to allow the required processes to be performed, including communicating with the data store 230 to retrieve second intensity descriptors and geometrical descriptors associated with extracted portions of the map, receiving sensor data from the laser sensor 220 including intensity data and range data, and performing intensity-based recognition and geometrical recognition. The applications software may include one or more software modules, and may be executed in a suitable execution environment, such as an operating system environment, or the like.

Accordingly, it will be appreciated that the electronic processing device 210 may be formed from any suitable processing system, such as a suitably programmed computer system, PC, lap-top, or hand-held PC such as a smartphone, tablet or the like which is mounted on-board the robot 205. In one particular example, the electronic processing device 210 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4A:
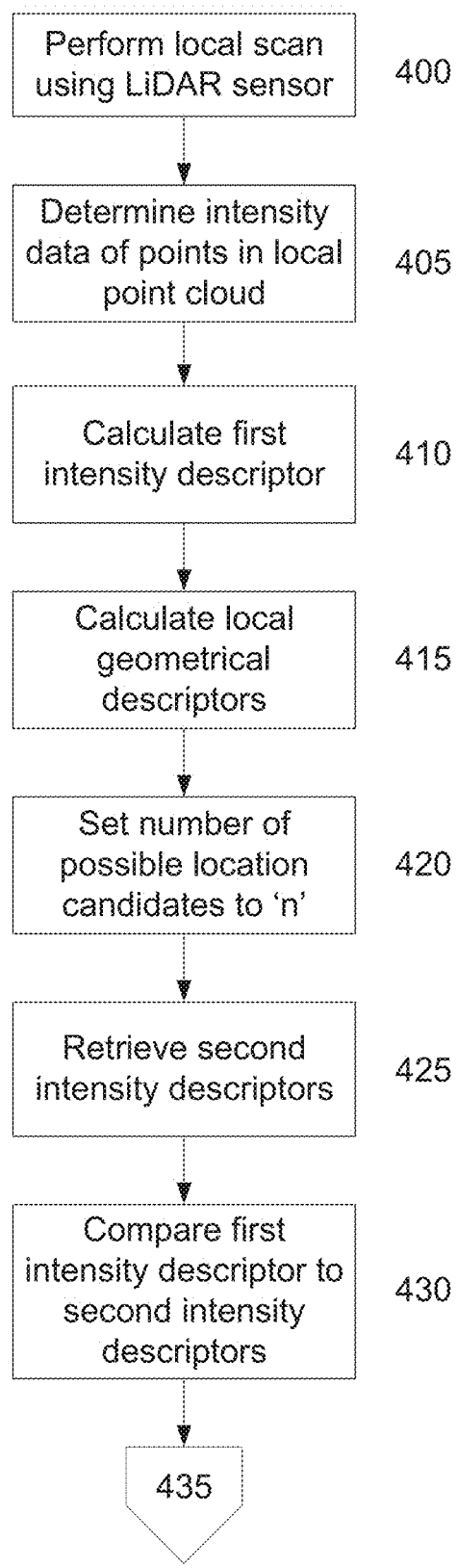
FIG. 4A to 4C provide a flow chart of an example of a specific process of performing localisation in a 3D environment.
Figure 4B:
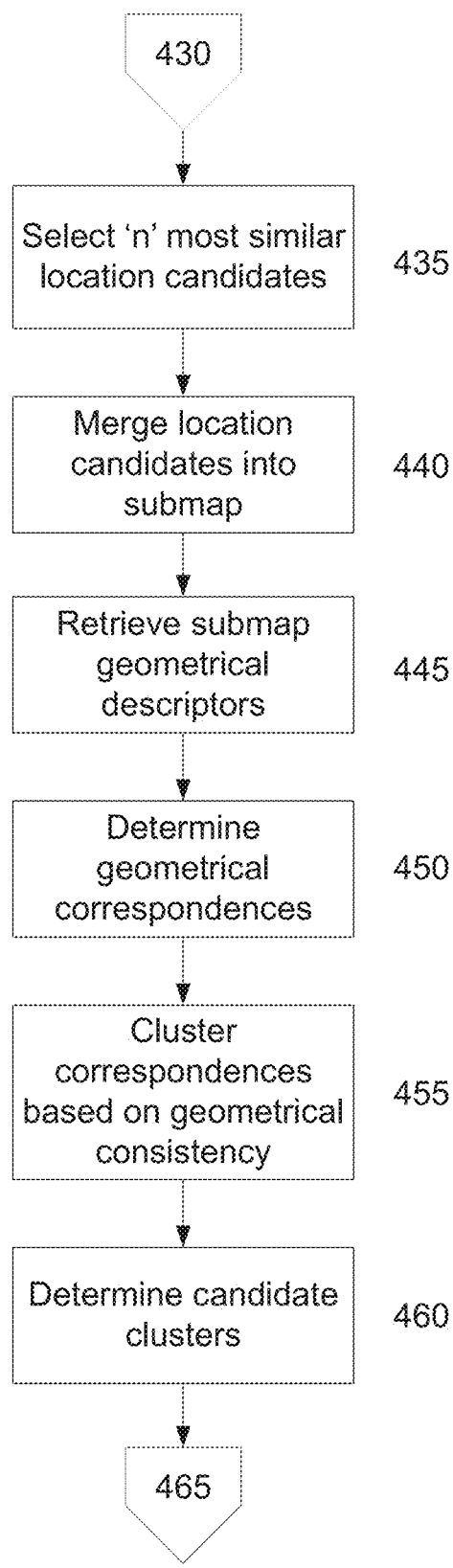
Figure 4C:
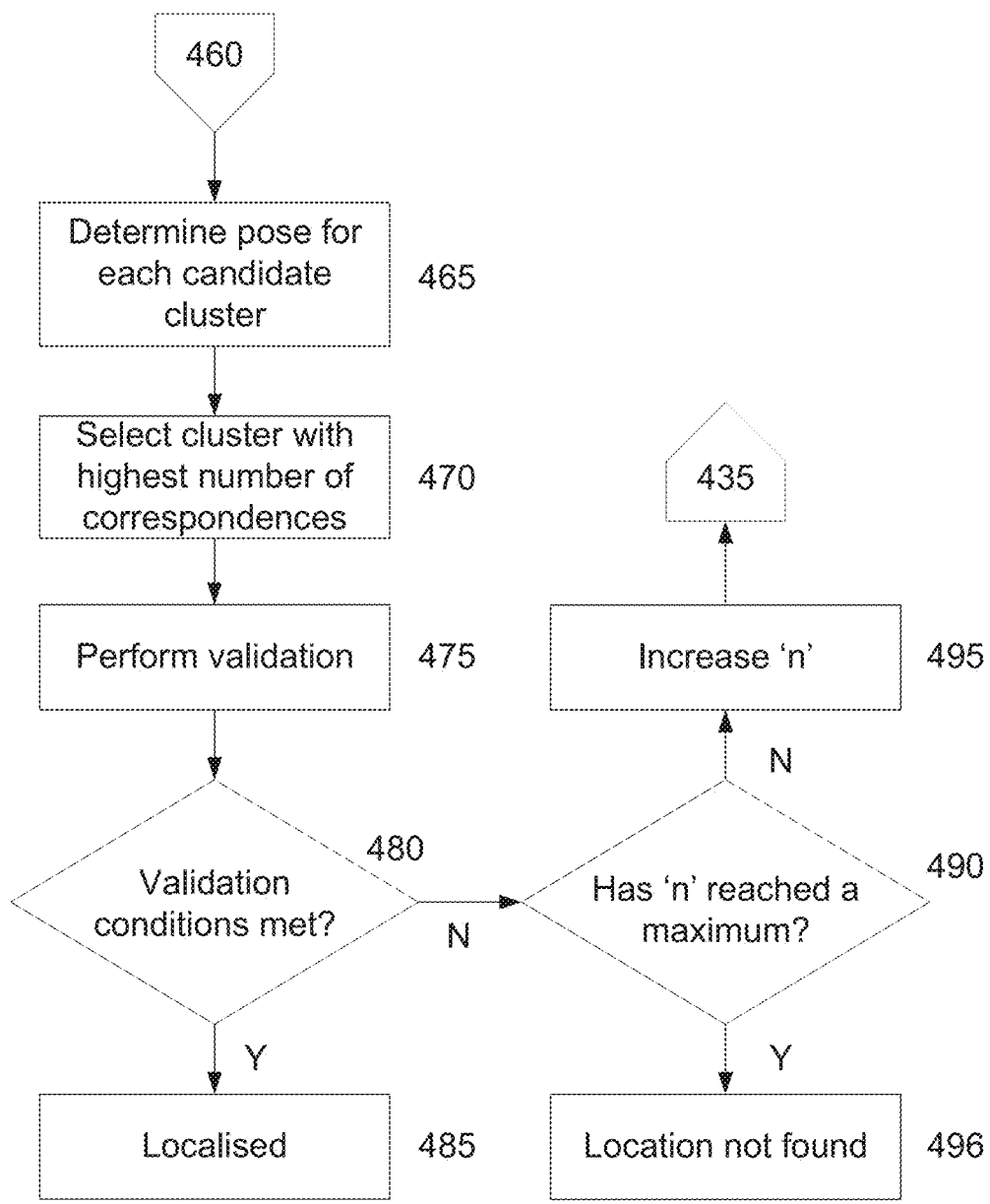

A specific process for use in performing localisation in a 3D environment shall now be described with reference to FIGS. 4A to 4C. The process described in this flowchart describes a preferred two-stage localisation pipeline including a first stage involving an intensity-based place recognition and a second stage which involves a geometrical place recognition to validate the correctness of the intensity-based match and also provide the desired transformation and pose.

The process begins at step 400 when a local scan of the environment is performed using a 3D LiDAR sensor. The local scan may be a "wake-up" scan performed by a robot upon waking up or initialising in an environment with no prior information about its location. The local scan produces a local 3D point cloud comprising all points that the sensor can see.

At step 405, the intensity data corresponding to the intensity of all points in the local point cloud is determined. As previously discussed, this information corresponds to a measure of the strength of the return of the laser which depends upon the reflectivity characteristics of the surface being scanned. As such, intensity data is highly descriptive of the environment in which the robot is located. In one example, the intensity data is simply read from messages arriving from the sensor.

Figure 6A:
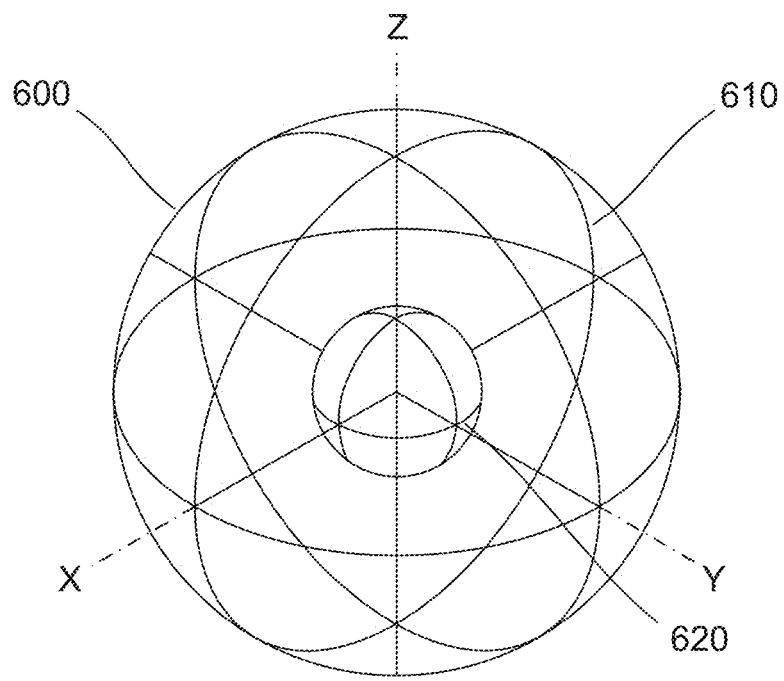
FIG. 6A is an example of the structure of an intensity descriptor.
Figure 6B:
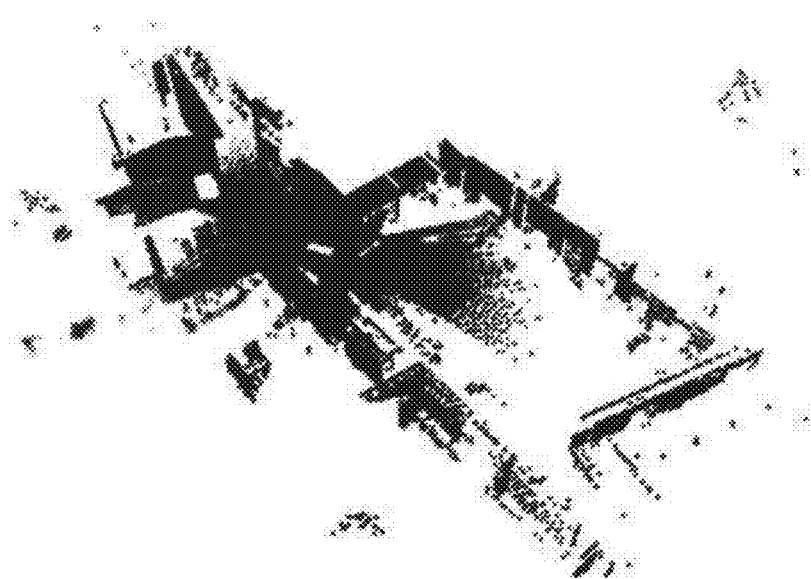
FIG. 6B is an example of an exemplary wake-up scan divided into spatially distributed segments.

At step 410, a first intensity descriptor is calculated using the intensity data of points in the local point cloud. This intensity descriptor consists of a sphere that is divided radially into concentric spheres and then segmented horizontally into hemispheres and then further segmented along an azimuth direction every 90 degrees. The resulting descriptor has 16 spatially distributed segments. A histogram of intensity of points falling into each of the 16 segments is then calculated so that the first intensity descriptor consists of 16 histograms of intensity. The usage of histograms reduces the dimensionality of the data set whilst the structured division of the descriptor maintains the uniqueness by associating the statistics with locations in space. An example of the structure of an intensity descriptor is shown in FIG. 6A along with an exemplary wake-up scan divided into spatially distributed segments which is shown in FIG. 6B.

At step 415, the local geometrical descriptors are calculated. To achieve this, the point cloud is first downsampled to reduce density of the cloud and then outliers are removed so as to minimise the impact of noise on the descriptors. Keypoints are then extracted from the point cloud based on random selection and form points around which the geometrical descriptors are computed. The normals of all points in the cloud are then computed and finally the descriptor is calculated. A suitable geometrical descriptor is referred to as SHOT descriptor which stands for the Signature of Histograms of Orientations and is noise robust while at the same time highly descriptive. The SHOT descriptor has a spherical support structure which is divided into 32 spatially distributed segments. For each segment, a histogram of normals is calculated, which gives robustness and additionally, the spatial location of each segment is fixed which ensures descriptiveness. It will be appreciated however that the SHOT descriptor is an exemplary example of a local descriptor that may be used, however any other local descriptor may be used as will be appreciated by a person skilled in the art.

At step 420, the number of possible location candidates is set to 'n'. Initially, 'n' will equal one which means that the most similar intensity-based place candidate is used to form the 'prior' or submap in which geometrical recognition is performed.

At step 425, the plurality of second intensity descriptors are retrieved from the data store and loaded into memory of the processor.

At step 430, the first intensity descriptor is compared against the second intensity descriptors. This is achieved by comparing histograms of intensity for each segment of the first intensity descriptor with the histogram of intensity of each corresponding segment of a second intensity descriptor. Respective histograms are compared using the chi-squared test:

$$S_{AB}^i = \sum_{k=1}^{m} \frac{2 \cdot (A(k) - B(k))^2}{A(k) + B(K)}$$

wherein: $S_{AB}^i$=similarity value between histogram of ith segment of descriptor A and histogram of ith segment of descriptor B; descriptor A=first intensity descriptor; descriptor B=second intensity descriptor; k=number of histogram's bin; m=number of bins in the histogram; A(k)=value of the kth bin of descriptor A; and, B(k)=value of the kth bin of descriptor B.

Figure 7:
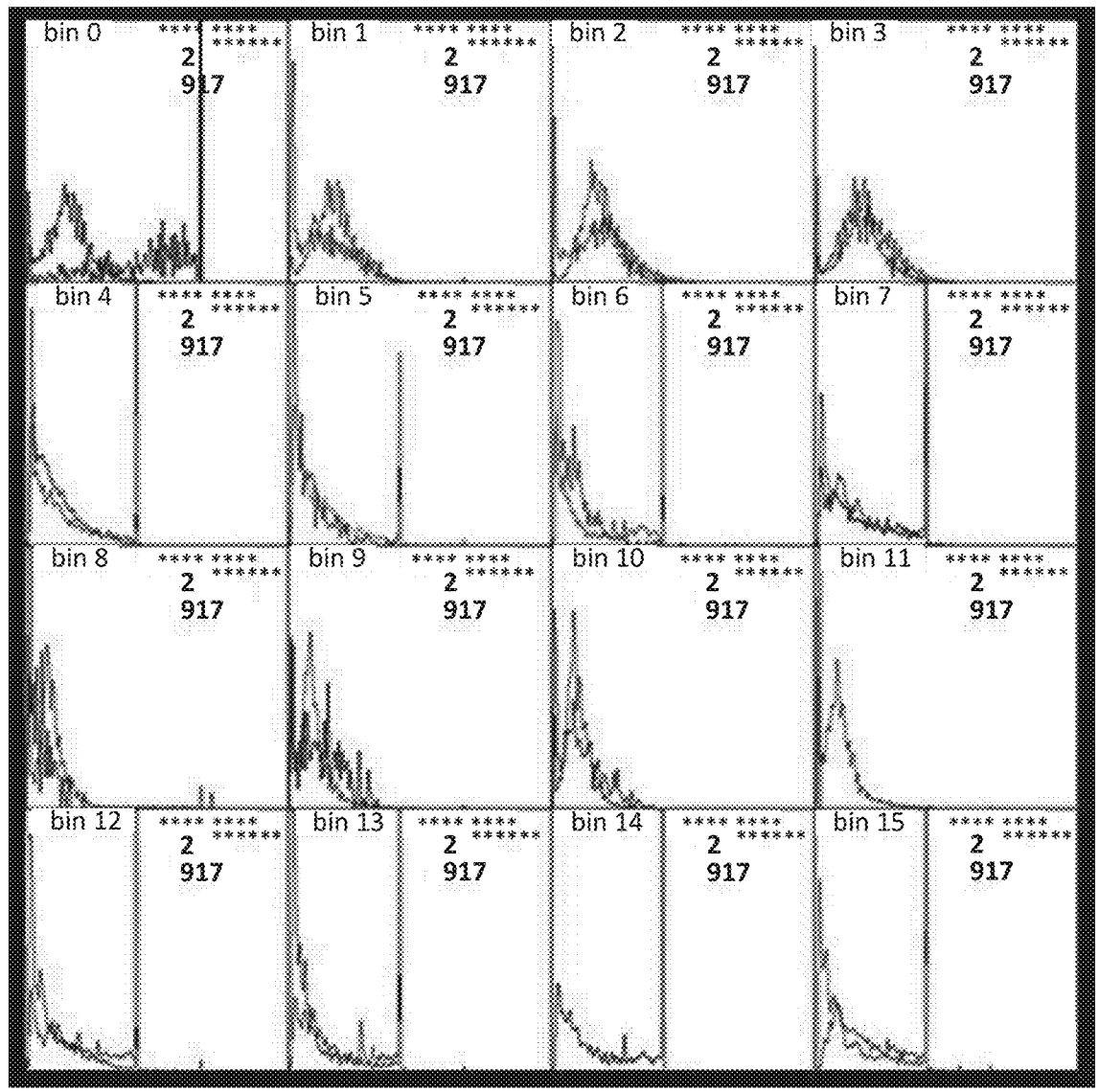
FIG. 7 is an example diagram of a comparison between intensity descriptors for completely different places.

The output of the comparison is a similarity value $S_{AB}^i$. The similarity metric of the two descriptors $S_{AB}$ is obtained as the average of results of chi-squared tests of all segments. A visual illustration of the comparison between histograms for two intensity descriptors in different places is shown in FIG. 7. The first place '2' corresponds to a dense cloud indicative of a structured environment with buildings. The second place '917' corresponds to a sparse cloud indicative of an unstructured environment with trees and bushes.

Figure 8:
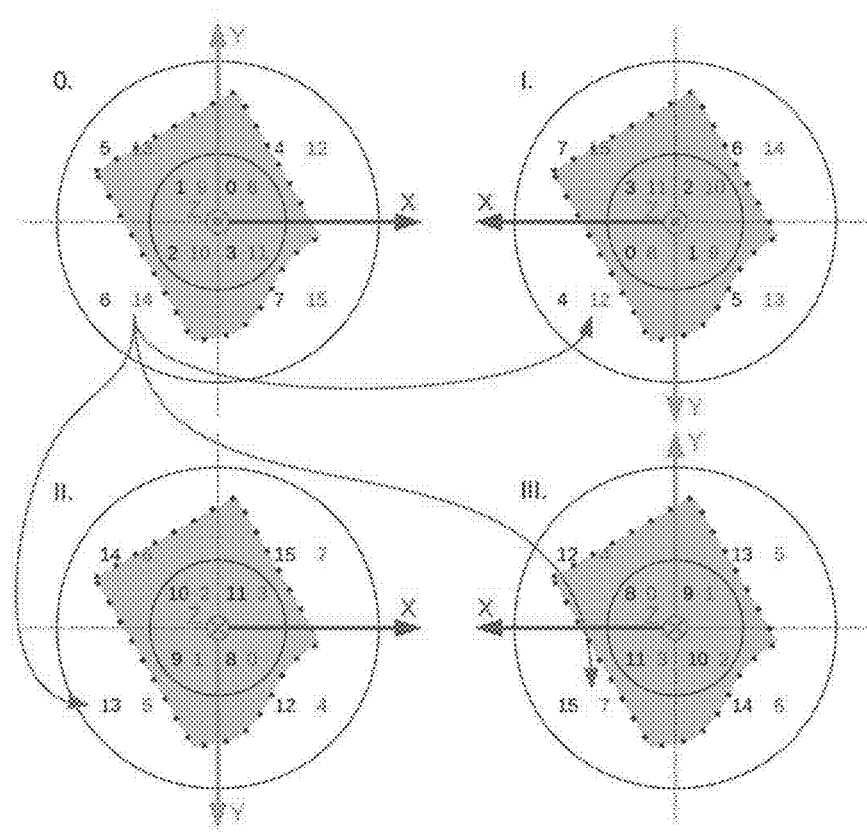
FIG. 8 is an example of a second intensity descriptor showing a reference frame oriented in four possible ways for purposes of comparison with a first intensity descriptor.

It should be further noted that typically a reference frame is computed for the intensity descriptor using a Principal Components Analysis (PCA). Since it is not possible to determine the sign of vectors comprising the reference frame this must be accounted for in order to ensure that histograms of corresponding segments of the descriptors are being compared to each other. The first intensity descriptor is therefore compared with four different versions of each second intensity descriptor. By different versions, different sequences of segments should be understood which are obtained by considering different orientations of reference frames of the descriptor as shown in FIG. 8. The method essentially assumes that all four combinations of reference frame orientation are possible. A similarity value $S_{AB}$ is determined for each of the four comparisons and the overall measure of similarity between the descriptors is defined as:

$$S_{AB} = \min\{{}^1S_{AB}, {}^2S_{AB}, {}^3S_{AB}, {}^4S_{AB}\}$$

At step 435, the 'n' most similar location candidates are selected in accordance with results of the comparison (i.e. based on the similarity metrics between descriptors). The location candidates are merged into a submap or 'prior' at step 440 by combining point clouds of the respective places.

At step 440, submap geometrical descriptors are retrieved from the data store, the submap geometrical descriptors based on geometrical descriptors determined for each portion of the map in the 'prior'.

At step 450, geometrical correspondences are determined. Each submap geometrical descriptor is queried against each local geometrical descriptor obtained from the local scan.

For each keypoint in the submap only one keypoint is selected from the local scan (the most similar). There is an additional constraint imposed: the similarity level must be below a defined threshold. The kd-tree is used as a search method with the dimensionality conforming to the number of the descriptor's dimensions.

The output is a single nearest neighbour which is considered a corresponding point if its similarity is below the mentioned threshold. The correspondences are gathered into a vector that stores the indices of the pairs of keypoints. In general, a single keypoint in the local scan can have several corresponding keypoints in the submap which includes possibility of multiple instances. The similarity threshold is therefore important because its value influences the strictness of the recognition. By increasing it, the system becomes less conservative to changes of the scene and more robust to the noise, on the other hand too a big value will result in false matches. The balanced parameter must be found experimentally.

At step 455, the correspondences are clustered based on geometrical consistency. The result of the correspondence search step is a set of matchings between points in the submap and those in the local scan. To ensure that found correspondences belong to the actual instances of the local scan, geometric constraint is imposed on them. The basic assumption is that the points in the clouds are rigidly coupled. This allows the keypoints to be clustered into sets that fulfil the geometric consistency criterion. By this condition two points in the submap are considered geometrically consistent if the difference between 2-norm of their subtraction and 2-norm of subtraction of corresponding points in the local scan is smaller than a defined consensus threshold. The geometric consistency consensus is another important parameter of the system. As a rule of thumb it must be bigger than the resolution of the clouds after downsampling (the difference in the points location can reach up to the resolution). But, since the keypoints are not guaranteed to be in the exact same positions in both clouds (because selected by downsampling) and because of the noise, the consensus value should be bigger (several cloud resolutions).

Additionally there is a condition on the minimum number of correspondences below which clusters are discarded. Afterwards, the RANSAC algorithm is used to further eliminate inconsistent correspondences. A set of candidate clusters are then determined at step 460 after the above constraints have been imposed on the correspondences.

At step 465, for each candidate cluster the transformation matrix is computed using the Absolute Orientation algorithm to obtain the pose. It is important to notice that this transformation is estimated based on the relative locations of the sets of keypoints, not the entire point clouds and the accuracy depends on the amount of keypoints in the clusters. The output of this stage is a set of candidate locations for the local scan with transformations to the submap.

At step 470, the candidate cluster having the highest number of correspondences is selected as the most likely location candidate.

At step 475, validation is performed in a two-step process. Firstly, the number of correspondences in the most likely location candidate is compared to a defined threshold. The number of correspondences must be larger than the threshold otherwise the location candidate is discarded as a false match.

The obtained transformation matrix of the most likely location is then refined using an Iterative Closest Point (ICP) algorithm. The ICP is applied to each point of the cluster with the highest number of correspondences in the submap and local scan. After refinement, the point clouds are precisely aligned. If ICP converges successfully it outputs the estimated transformation matrix.

Additionally, ICP outputs the fitness score i.e. the metric of how well the point clouds are aligned. This forms part of a second validation condition that checks whether the fitness score exceeds an acceptable level (above a defined threshold). If it does, the place is considered as a false match.

At step 480, the method checks whether the above mentioned validation conditions have been met. If they have then the robot is considered to be localised and the method terminates at step 485. If one or both validation conditions are not met, then at step 490 the method checks whether the maximum number of place candidates 'n' for the prior has been reached. If so, then no further searching is performed and the algorithm terminates at step 496 deeming that it is not possible to find the location. Otherwise, the size of the prior is increased at step 495 and the submap is extended by considering further place candidates and the method returns to step 435.

Figure 5:
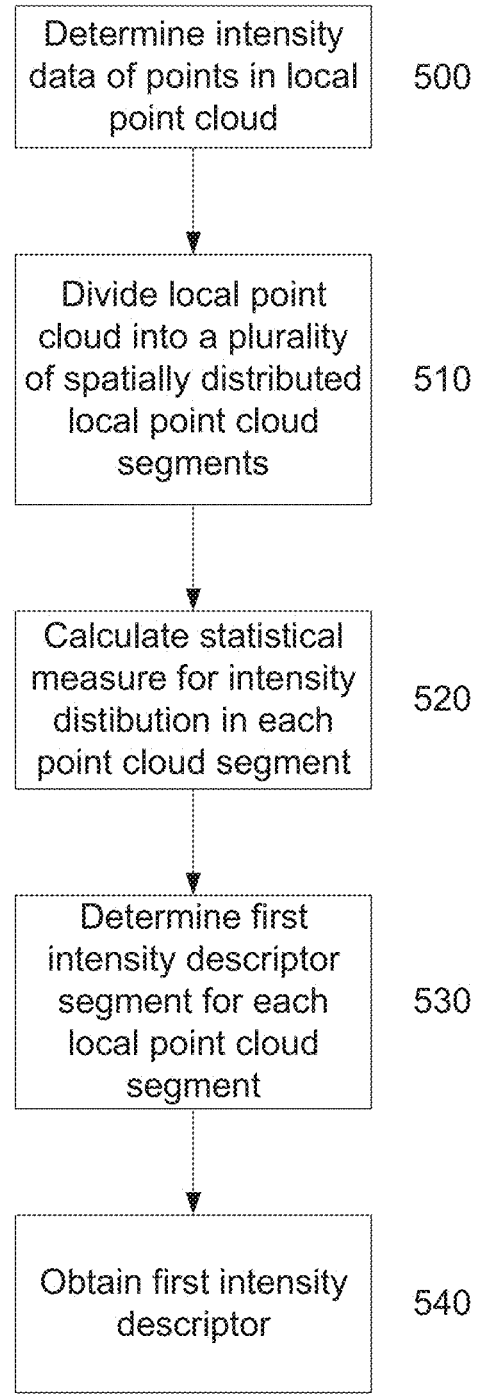
FIG. 5 is a flow chart of an example of calculating a first intensity descriptor associated with a local scan.

A flow chart of an example of calculating a first intensity descriptor associated with a local scan will now be described with reference to FIG. 5.

In this example, at step 500 the intensity data of points in the local point cloud is determined from the 3D LiDAR scan.

At step 510, the local point cloud is divided into a plurality of spatially distributed local point cloud segments for example as shown in FIG. 6A. A statistical measure for intensity distribution of points in each point cloud segment is then calculated at step 520. In a preferred implementation, a histogram of intensity is determined for each point cloud segment which forms a first intensity descriptor segment at step 530. In other examples, an alternative statistical measure may be used for example the average of intensity values of points in a point cloud segment or the variance of the intensity values.

Finally, the first intensity descriptor segments are used to define the first intensity descriptor at step 540. When histograms are used, the first intensity descriptor defines a group of histograms of intensity which characterise the appearance of the local scan in a compact and unique form.

Figure 9:
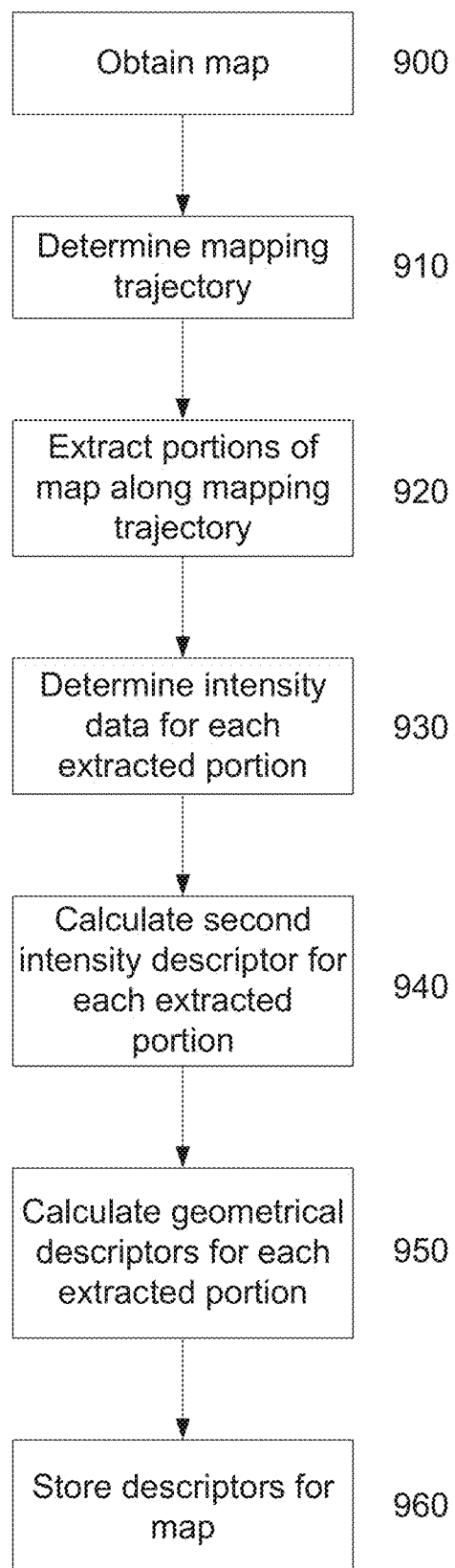
FIG. 9 is a flow chart of an example of performing pre-processing of a map of the 3D environment.

A flow chart of an example of a method of performing pre-processing of a map shall now be described with reference to FIG. 9.

In this example, at step 900 a map is obtained by driving an autonomous vehicle or robot around in a 3D environment whilst a 3D LiDAR sensor is scanning. A SLAM algorithm may be used to obtain a map of the environment.

A mapping trajectory is also recorded and at step 910 the method includes obtaining the mapping trajectory. At step 920, portions of the map are extracted along the mapping trajectory. The extraction is based on distance and accordingly the map is divided by segmenting the trajectory into chunks of length 'l' (e.g. l=2 m) and creating point clouds from all points visible along each chunk with an origin of the cloud located in the middle of the chunks.

At step 930, the intensity data is determined for points in clouds of each extracted portion (also known as a 'place' as previously mentioned).

At step 940, a second intensity descriptor is calculated for each extracted portion using the same techniques as previously described for the first intensity descriptor. Geometrical descriptors are also calculated at step 950 for each extracted portion using previously described techniques used for the local geometrical descriptors (such as downsampling, outlier removal, keypoint selection, normals computation etc.). Finally, at step 960, the second intensity descriptors for each extracted portion from the map are stored in the data store for subsequent retrieval by the electronic processing device for use in localisation.

Experiments and Validation

Figure 10A:
FIG. 10A is a satellite photo of a site where experiments were performed.
Figure 10B:
FIG. 10B is an example of a point cloud obtained my mapping the site of FIG. 10A with the mapping trajectory shown in white.

Experiments were conducted to validate the system within the Queensland Centre for Advanced Technologies site in Brisbane, Australia. A satellite photo of the test environment with the wake-up locations marked is shown in FIG. 10A. The whole area was mapped using a SLAM algorithm which provided the 1 map (i.e. global point cloud) and the corresponding mapping trajectory which is shown in FIG. 10B.

The test environment has multiple characteristics. There are places of a fully structured nature such as buildings and completely unstructured regions composed of trees or bushes. Obviously, there are areas that contain elements of both types and are combinations of structured and unstructured surroundings. Additionally, the spatial distribution of points for different places also varies significantly throughout the map. Spots between the buildings are usually very restricted and tight, which prevents the scans obtained there from containing considerable amount of points, but which are usually quite unique and easily distinguishable. On the other hand, there are also open space locations with only sporadic trees and bushes, which lack significant distinctive features, but frequently contain lots of points (measured as the reflection from the ground). All of that makes the site an environment that is very challenging for the recognition, especially with the requirement that it should be based solely on the LiDAR data.

To validate the system, a set of various wake-up scans (i.e. local scans) were generated. Overall there were 101 locations tested across the site, all of them can be seen in FIG. 10A. As it can be noticed, the points are fairly uniformly distributed around the map, which keeps the variety of the places' characteristics and ensures statistical meaningfulness of the results. What is more, the scans were generated at different distances from the original mapping trajectory to verify the robustness to alterations. It is also important to mention that the whole set was generated on multiple days. This means that there were various light conditions and temperatures, which allowed verification of their influence on the intensity-based descriptors.

The map was divided into the set of places according to the method previously described. The trajectory was around 4 km long, therefore, with the resolution of the consecutive clouds set to 2 m, the map was divided into 2055 places.

The validation of the system is based on establishing the success rate of the recognition in a multi-characteristics environment. In the proposed system, the recognition is deemed successful if the algorithm can find the correct pose faster than the classical geometry-based approach. In the following sections the geometry-based only pipeline will be referred to as the classical approach whilst the two-stage intensity and geometrical based recognition will be referred to as the combined pipeline. More specifically, the place is considered a correct match if the correctness (i.e. validation) conditions are met as defined earlier. The parameters for this criteria were adjusted by performing various experiments.

For some of the scans the correctness was evaluated directly by parsing the found pose to the navigation pipeline. If the procedure can start (a correct alignment) it means that the pose was found successfully. In most cases however, the global localisation tests were done separately from navigation due to the fact that both pipelines were developed simultaneously and it usually was not possible to perform mutual tests.

In such cases, the recognition was performed using the classical approach first (i.e. localisation in a map as a single cloud), the result of it was treated as a ground truth. If the combined pipeline found a place of the same coordinates (with permissible error of the norm <1 m) the place was considered correct.

For some of the scans (in overall eight in the entire set) the geometry-based localisation in the map consisting of the single cloud failed. In such situations, the parameters of the classical approach were changed (namely, the resolution of downsampling was increased to obtain more descriptors). For five places, the changed parameters did not help and the geometry-based only approach failed. In these cases, the correctness of the combined approach was estimated by a visual inspection of the position of the found place in the map and the alignment of the point clouds.

To make sure that the performance of the combined pipeline is faster than the classical approach the maximum amount of places that form the prior was limited to 49. This number was also established experimentally to keep the processing time shorter than 50% of the classical approach. As however the experiments show, extension of the prior of further than 25 places did not result in an increase of the likelihood of finding the correct pose.

Figure 10C:
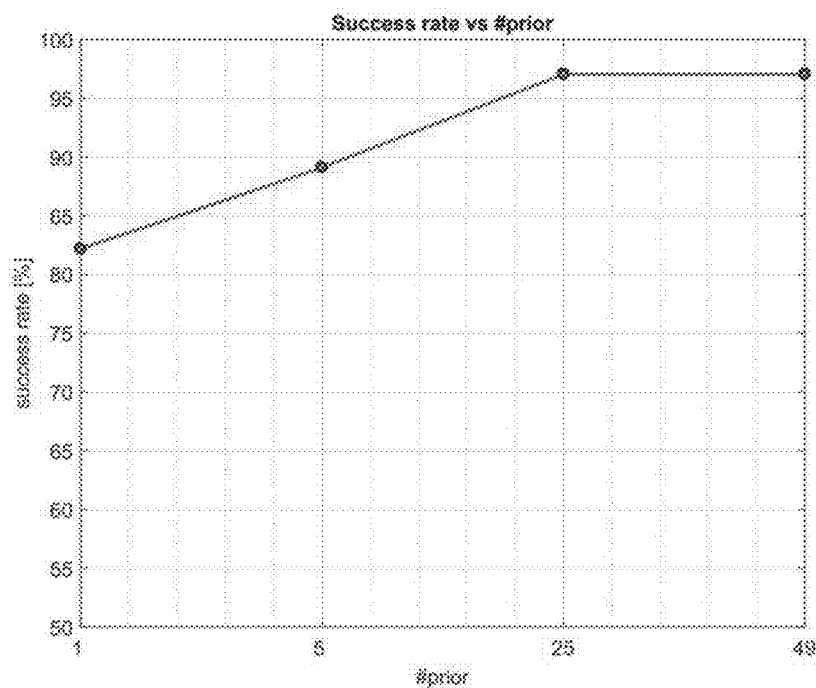
FIG. 10C is a graph of the localisation success rate against number of places in the prior.

Overall, the system proved very successful with the overall success rate reaching 97%. The rate being so high originates from the robust algorithm structure namely the possibility of increasing the prior (i.e. number of place candidates) in case the geometry-based validation is not certain of the recognition. The plot shown in FIG. 10C visualises the effect of the increase in prior size on overall localisation success rate. In this graph, the success rate of the next prior size consists of the success rate from the previous prior size and additional places that were recognised by increasing the prior size. The results of all experiments are plotted (i.e. 101 wake-up locations).

In most cases (82%), the system was able to correctly localise using only one place. As can be clearly seen from the plot, the increase in prior size to 5 and 25 places increases the success rate, however a further increase of the prior size was shown to not provide any further improvement in recognition (whilst inevitably resulting in deterioration of the processing time).

In many global localisation algorithms, the underlying assumption is that the robot "revisits the place" (i.e. the place it can see currently has been already visited before). This means that the recognition capabilities are limited to the close neighbourhood of the trajectory. The proposed algorithm is universal and can handle, to a sensible extent, the location of the robot at random distances to the trajectory. The system can cope with the robot being up to 5 metres from the trajectory which means that it can be located within a 10 m wide radius around the mapping path and still robustly localise. Additionally, for further distances the success rate remains at a satisfactory level of 70%. This is an excellent result which demonstrates the robustness of the system.

Figure 10D:
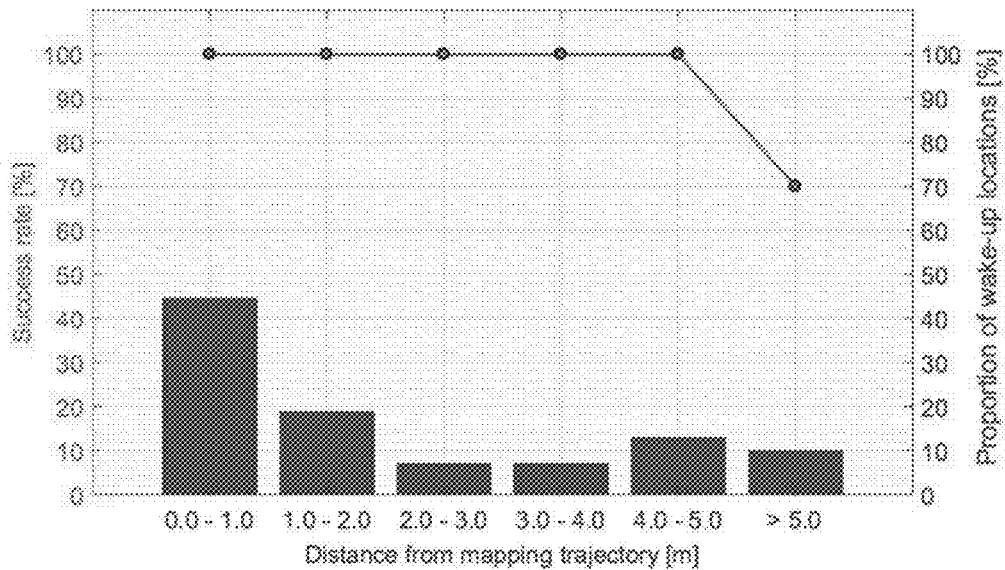
FIG. 10D is a graph of the localisation success rate for wake-up locations at different distances from the mapping trajectory.
Figure 10E:
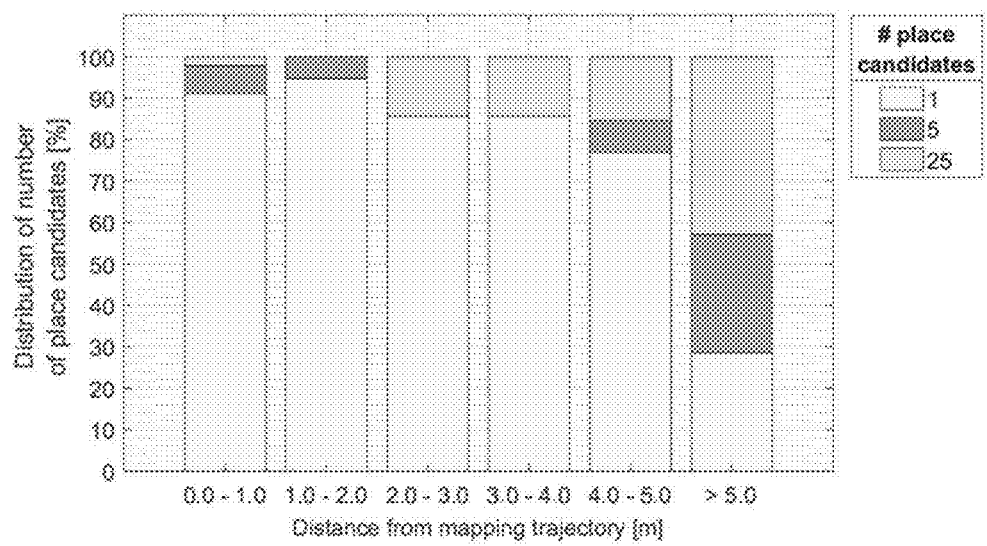
FIG. 10E is a graph of the required number of place candidates to successfully localise for wake-up locations at different distances from the mapping trajectory.

Referring to FIG. 10D, there is shown a graph of the success rate of localisation for different distances from the trajectory. The bar chart depicts the proportion of wake-up locations at different distance ranges to the mapping trajectory. In FIG. 10E, there is shown a graph of the required number of place candidates (distribution of the prior size) to successfully localise at different distances from the mapping trajectory.

As one should expect, with the increased distance from the trajectory, the certainty of the intensity-based recognition decreases. This is caused by the fact that the robot can see objects that were not visible from the original trajectory. Additionally, far off the mapping path, the same objects are visible from different incidence angle, and since it is not compensated, it introduces uncertainties into the intensity histograms. It is nicely visible that when the robot is further from the trajectory, a bigger prior needs to be considered. One of the reasons is that the objects fully visible from the location off-trajectory are only partially visible from various places on the trajectory. Therefore, by combining the partial views, it is possible to create a cloud that contains enough information to perform a successful, geometry-based localisation.

Additionally, it can be noticed that the need to increase the prior size occurs also for a few cases of scans being close to the trajectory. This is caused by the fact that the environment is dynamic and some objects may occur at the wake-up that were not visible during the mapping. This results in a reduction of the intensity-based recognition certainty. On the other hand, it is another justification for the need of the prior size extension functionality, which enables the algorithm to cope with dynamic changes in the environment.

One of the most important motivations for the development of the system was the requirement for the reduction of the processing time. In the classical approach, when the correspondences are searched for in the entire global map point cloud, the process takes an unacceptable amount of time. Depending on the character of the cloud (structured and compact in case of building or unstructured and vast for open-spaces/bushlands) the search can take between 3 to 20 minutes. For a utility vehicle that has to perform certain tasks it is intolerable to wait for so long for the start of the operation.

Figure 10F:
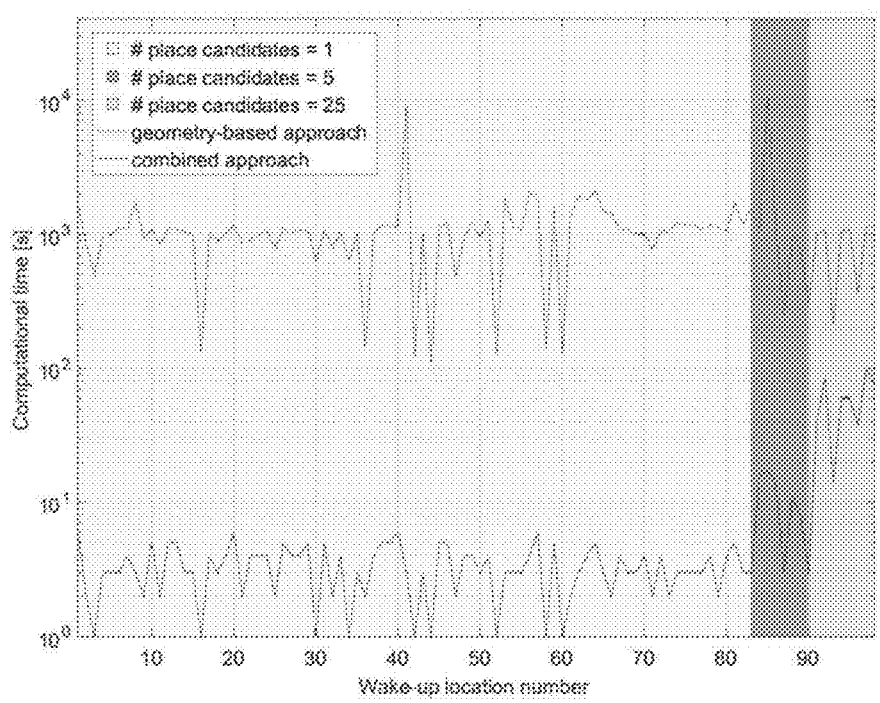
FIG. 10F is a logarithmic graph of the computation time for localisation of using the present method compared to using a traditional geometry-based approach only; and, FIG. 10G illustrates an example of the reduction in search space obtained using the system by showing a place candidate extracted from the map using intensity-based recognition.
Figure 10G:
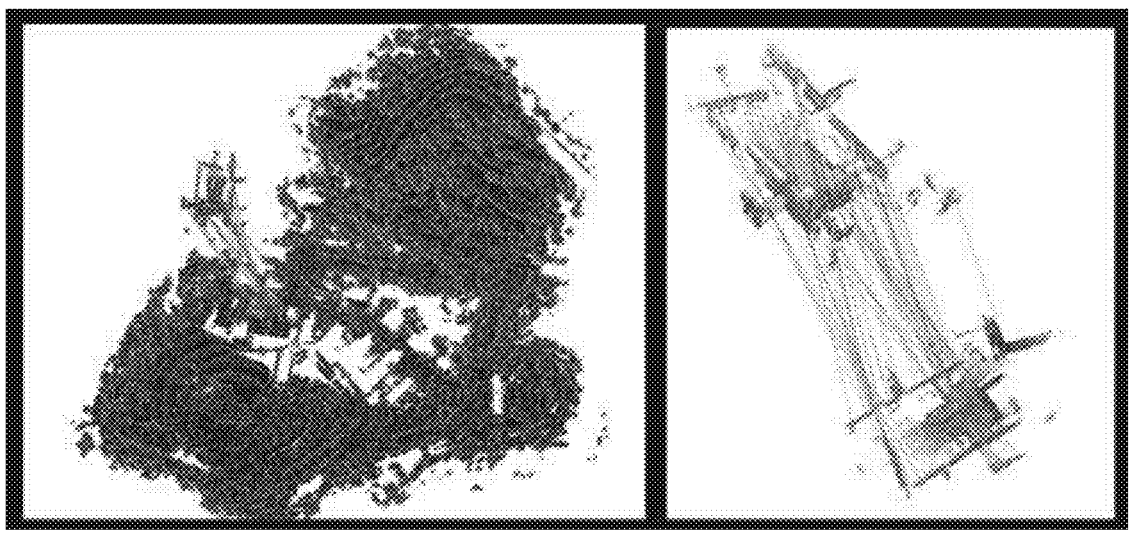

The proposed algorithm perfectly accommodates the time requirement. With the intensity-based prior, the limitation of the search space is tremendous (as shown for example in FIG. 10G). The comparison of the processing times using the classical approach and the combined approach is shown in FIG. 10F. It is clearly noticeable that the time reduction in the vast majority of cases reaches around 99% (the vertical axis is logarithmic). Only in case of the prior consisting of 25 places the reduction is worse but still achieves around 90%. The results are very satisfactory and prove that, in most cases, the solution can be considered as a real-time global localisation algorithm.

Accordingly, it will be appreciated that in at least one example the above described method and system provides an efficient algorithm for use in performing global localisation and in some examples provides an efficient solution to the wake-up or lost robot problem where the robot has to estimate its pose in a known map without any prior knowledge. From the foregoing, it will be understood however that the system may find use in other applications requiring global localisation such as loop closure and the like. The system is capable of performing global localisation using data obtained from an on-board 3D LiDAR sensor only, without dependency on any external beacons, GPS, IMU data or the like. The two-stage localisation pipeline presented herein uses a novel intensity-based descriptor to determine a prior estimate of the robot's position which is followed by a geometry-based verification which is performed to determine the pose and correctness of the intensity-based match. The whole procedure may be performed by a completely stationary robot and does not require motion for the position estimation. Experimental data shows that the method and system is robust to changes in the environment and shows that the system is applicable to autonomous navigation in real-world situations.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method for use in performing localisation in a three-dimensional (3D) environment, the method including in one or more electronic processing devices:
   a) determining from a local scan performed by at least one laser sensor, intensity data based at least in part on a power of radiation returned to the at least one laser sensor from points in a local point cloud obtained from the local scan;
   b) calculating a first intensity descriptor for the local point cloud using the intensity data associated with the local point cloud;
   c) retrieving a plurality of previously calculated second intensity descriptors that are each associated with a respective portion of a map of the 3D environment;
   d) comparing the first intensity descriptor with at least some of the second intensity descriptors; and,
   e) determining a location with respect to the map at least in part in accordance with a second intensity descriptor identified by the comparison.

2. The method according to claim 1, wherein the method includes, in the one or more electronic processing devices, calculating the first intensity descriptor based on at least one statistical measure for a distribution of the intensity data in the local point cloud.

3. The method according to claim 2, wherein the method includes, in the one or more electronic processing devices, calculating the first intensity descriptor by:
   a) dividing the local point cloud into a plurality of spatially distributed local point cloud segments;
   b) for each local point cloud segment calculating a first intensity descriptor segment based on a statistical measure for a distribution of intensity data within the local point cloud segment; and,
   c) calculating the first intensity descriptor using each first intensity descriptor segment.

4. The method according to claim 2, wherein the statistical measure is indicative of a distribution of the frequency of each of a plurality of intensity values.

5. The method according to claim 4, wherein at least one of:
   a) the local point cloud segments have an at least partially spherical structure;
   b) the local point cloud segments includes at least one of:
      i) a plurality of concentric spherical regions; and
      ii) at least two concentric spherical regions segmented into octants; and
   c) a radius of an outer spherical region is based on a range of the sensor and a radius of one ore more inner spherical regions is selected so that each spherical region contains a similar number of local point cloud points.

6. The method according to claim 1, wherein at least one of:
   a) the second intensity descriptors are previously calculated using intensity data associated with points in a point cloud corresponding to the map of the 3D environment, the intensity data based at least in part on a power of radiation returned to the at least one laser sensor from the points in the point cloud in a previously performed scan of the 3D environment;
   b) each second intensity descriptor includes second intensity descriptor segments obtained for point cloud segments of a part of the point cloud corresponding to the respective portion of the map; and
   c) the plurality of second intensity descriptors are stored in a data store and wherein the method includes, in the one or more electronic processing devices, retrieving the plurality of second intensity descriptors from the data store.

7. The method according to claim 6, wherein the method includes, in the one or more electronic processing devices:
   a) comparing the first intensity descriptor to a second intensity descriptor by:
      i) comparing the first intensity descriptor segments with the second intensity descriptor segments; and,
      ii) determining a similarity value based on results of the comparisons; and,
   b) selecting one or more second intensity descriptors based on the similarity values.

8. The method according to claim 7, wherein the method includes at least one of:
   a) in the one or more electronic processing devices:
      i) for each comparison between the first intensity descriptor and a second intensity descriptor:
         (1) determining a plurality of relative orientations of the second intensity descriptor; and,
         (2) comparing the first intensity descriptor segments with the second intensity descriptor segments for each of the plurality of relative orientations of the second intensity descriptor;
      ii) determining a similarity value for each orientation; and,
      iii) selecting a minimum similarity value; and
   b) in the one more electronic processing devices, using similarity values between the first intensity descriptor and respective second intensity descriptors to rank portions of the map as potential locations.

9. The method according to claim 8, wherein the method includes, in the one or more electronic processing devices:
   a) generating a submap using at least one portion of the map selected based on the ranking of portions of the map as potential locations; and,
   b) performing geometrical recognition within the submap.

10. The method according to claim 9, wherein the method includes, in the one or more electronic processing devices, performing the geometrical recognition by:
   a) extracting local keypoints from the local point cloud;
   b) calculating local geometrical descriptors for each local keypoint;
   c) retrieving previously calculated submap geometrical descriptors calculated using submap keypoints associated with the portions of the map that are included in the submap;
   d) determining correspondences between local and submap geometrical descriptors;
   e) clustering correspondences based on geometric consistency to form one or more candidate clusters; and,
   f) determining transformations for each candidate cluster.

11. The method according to claim 10, wherein the method includes, in the one or more electronic processing devices:
   a) selecting a candidate cluster having the highest number of correspondences;
   b) comparing the number of correspondences in the selected candidate cluster to a first threshold; and
   c) at least one of:

i) determining that the selected candidate cluster is a false match if the number of correspondences is below the first threshold; and,
  ii) determining that the selected candidate cluster is indicative of a most likely location if the number of correspondences is above the first threshold.

12. The method according to claim 11, wherein at least one of:
  a) for the candidate cluster indicative of the most likely location, the method includes, in the one or more electronic processing devices, refining the transformation to align the local point cloud with a submap point cloud associated with the submap;
  b) the method includes, in the one or more electronic processing devices, performing an Iterative Closest Point (ICP) on at least part of the local and submap point clouds to refine the transformation and determine the pose; and
  c) the method includes, in the one or more electronic processing devices:
    i) determining a fitness score that is indicative of how well the local and submap point clouds are aligned;
    ii) comparing the fitness score to a second threshold; and
    iii) selectively verifying the location depending on results of the comparison.

13. The method of claim 12, wherein the method includes, in the one or more electronic processing devices, at least one of:
  a) generating a new submap if one of:
    i) the number of correspondences is below the first threshold; and,
    ii) the fitness score is above the second threshold;
    generating a new submap at least in part using other portions of the map selected
  b) based on the ranking of portions of the map as potential locations; and
  c) determining how many potential locations have been included in the submap and at least one of:
    i) terminating the localisation method if the number of potential locations has reached a defined maximum; and
    ii) increasing the size of the submap if the number of potential locations is below the defined maximum.

14. The method according to claim 1, wherein the local scan is at least one of:
  a) a stationary scan.
  b) a wake-up scan associated with a mobile robot or autonomous vehicle; and,
  c) a loop closure scan.

15. The method according to claim 1, wherein the at least one laser sensor is a light imaging, detection and ranging (LiDAR) sensor.

16. The method according to claim 1, wherein portions of the map are extracted from the map along a mapping trajectory.

17. The method according to claim 16, wherein the mapping trajectory is divided into segments of a pre-defined length and each portion of the map is defined as a point cloud obtained from the at least one sensor as it travelled along a respective segment of the mapping trajectory.

18. A system for use in performing localisation in a three-dimensional (3D) environment, the system including one or more electronic processing devices configured to:
  a) determine from a local scan performed by at least one laser sensor, intensity data based at least in part on a power of radiation returned to the at least one laser sensor from points in a local point cloud obtained from the local scan;
  b) calculate a first intensity descriptor for the local point cloud using the intensity data associated with the local point cloud;
  c) retrieve a plurality of previously calculated second intensity descriptors that are each associated with a respective portion of a map of the 3D environment;
  d) compare the first intensity descriptor with at least some of the second intensity descriptors; and,
  e) determine a location with respect to the map at least in part in accordance with a second intensity descriptor identified by the comparison.

19. The system according to claim 18, wherein the system includes at least one of:
  a) at least one laser sensor configured to perform the local scan;
  b) at least one sensor configured to perform the local scan that is a light imaging, detection and ranging (LiDAR) sensor; and
  c) a data store containing the plurality of second intensity descriptors and wherein the data store is accessible by one or more electronic processing devices to retrieve the plurality of second intensity descriptors.

20. The system according to claim 18, wherein the at least one laser sensor, one or more electronic processing devices and data store are located on-board a mobile robot or autonomous vehicle.

* * * * *